(12) United States Patent
Feng (10) Patent No.: US 8,351,310 B2
(45) Date of Patent: Jan. 8, 2013

(54) METHOD AND APPARATUS FOR DETERMINING AN OPTIMAL FOCUS BIAS AND SPHERICAL ABERRATION COMPENSATING VALUE IN AN OPTICAL DISC DRIVE

(75) Inventor: Wen-Chun Feng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 15 days.

(21) Appl. No.: 13/207,851

(22) Filed: Aug. 11, 2011

(65) Prior Publication Data

US 2012/0044792 A1 Feb. 23, 2012

(30) Foreign Application Priority Data

Aug. 20, 2010 (TW) .............................. 99128038 A (51) Int. Cl.
*G11B 7/00* (2006.01)

(52) U.S. Cl. ................. 369/44.32; 369/47.44; 369/53.12

(58) Field of Classification Search ............... 369/44.32, 369/47.44, 53.12
See application file for complete search history.

(56) References Cited

U.S. PATENT DOCUMENTS

| | | | |
|---|---|---|---|
| 7,260,032 B2 * | 8/2007 | Tadano | 369/44.29 |
| 7,344,077 B2 | 3/2008 | Sagara et al. | |
| 7,403,454 B2 * | 7/2008 | Nishi | 369/44.32 |
| 7,480,216 B2 * | 1/2009 | Isshiki et al. | 369/44.23 |
| 7,542,398 B2 * | 6/2009 | Nishi | 369/112.02 |
| 7,630,278 B2 * | 12/2009 | Natanasigamani et al. | 369/44.25 |
| 7,715,286 B2 * | 5/2010 | Miyake et al. | 369/44.23 |
| 7,719,950 B2 * | 5/2010 | Nishino | 369/112.23 |
| 7,746,736 B2 * | 6/2010 | Yamasaki et al. | 369/44.41 |
| 7,768,880 B2 * | 8/2010 | Sagara | 369/44.23 |
| 7,782,722 B2 * | 8/2010 | Miyaoka | 369/44.29 |
| 2004/0136281 A1 * | 7/2004 | Yanagisawa et al. | 369/44.32 |
| 2004/0196766 A1 * | 10/2004 | Tadano | 369/53.23 |
| 2007/0097809 A1 * | 5/2007 | Miyaoka | 369/44.23 |
| 2008/0074973 A1 | 3/2008 | Nishino | |
| 2009/0059742 A1 * | 3/2009 | Luyten et al. | 369/44.23 |
| 2011/0235482 A1 * | 9/2011 | Kanatake et al. | 369/44.32 |

* cited by examiner

*Primary Examiner* — Wayne Young
*Assistant Examiner* — Brenda Bernardi
(74) *Attorney, Agent, or Firm* — WPAT PC; Justin King (57) ABSTRACT

A method for determining an optimal combination of focus bias and spherical aberration compensating value (SA value) in an optical disc drive is provided. Firstly, a first focus bias is set, the SA values are adjusted and the corresponding tracking error signal values are measured. Second-order-approximation is performed to obtain a first maximum value of tracking error signal. Secondly, a second focus bias is set, the SA values are adjusted and the corresponding tracking error signal values are measured. Second-order-approximation is performed to obtain a second maximum value of tracking error signal. Thirdly, a third focus bias is set, the SA values are adjusted and the corresponding tracking error signal values are measured. Second-order-approximation is performed to obtain a third maximum value of the tracking error signal. The three maximum values are compared to obtain the optimal combination of focus bias and SA compensating value in the optical disc drive.

22 Claims, 10 Drawing Sheets

METHOD AND APPARATUS FOR DETERMINING AN OPTIMAL FOCUS BIAS AND SPHERICAL ABERRATION COMPENSATING VALUE IN AN OPTICAL DISC DRIVE

This application claims the benefit of Taiwan application Serial No. 99128038, filed on Aug. 20, 2010, the subject matter of which is incorporated herein by reference.

FIELD OF THE INVENTION

The present invention relates to a method and an apparatus for determining the number of data layers in an optical disc, and more particularly to a method and an apparatus for determining the number of data layers in a blu-ray optical disc.

BACKGROUND OF THE INVENTION

The performance of an optical disc drive is greatly related to the optical quality of the inner system and spherical aberration is one of important factors for degrading the optical quality of the inner system. When the inner optical quality of the optical disc drive is affected with spherical aberration, the focus error signal and the tracking error signal generated by the optical disc drive are easily distorted so that the servo control becomes more difficult and the unfocused condition or off-track condition possibly happens. Moreover, the deformed light spot of the read/write laser light of the optical disc drive resulted from spherical aberration causes more errors in radio frequency signal when reading discs and poor write quality of the optical disc drive.

Figure 1:
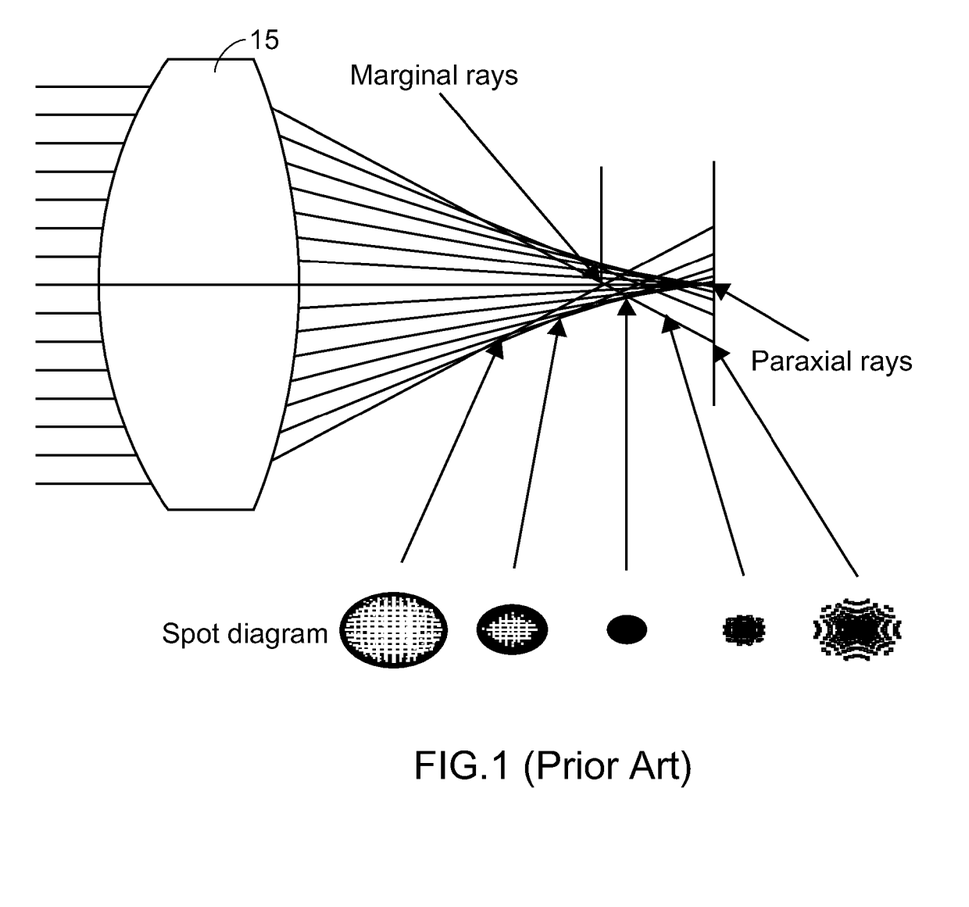
FIG. 1 (Prior art) is a diagram showing spherical aberration.

Please refer to FIG. 1, which is a diagram showing spherical aberration. The main reason why spherical aberration occurs is that an optical path difference $\Delta\lambda$ between the marginal rays and the paraxial rays of the laser light exists when the marginal rays and the paraxial rays reaches the foci plane. The light spot at the foci plane becomes elliptic which resulted from spherical aberration. However, the shape of an optical light spot should be round. In addition the energy distribution of the laser light at the foci plane deteriorates because of spherical aberration which results in the affection of the read/write quality of the optical disc drive.

Generally there are two ways to compensate spherical aberration (SA) in an optical system. One is to adopt a liquid crystal SA compensator and the other is to adopt a collimating SA compensator.

The liquid crystal SA compensator is usually composed of liquid crystal material. The refractive index of the liquid crystal SA compensator is varied with the inputted voltage level, thus the laser light which passes through the liquid crystal SA compensator is compensated so that the shape of the light spot which the laser light reaches the optical disc is circular. The second way to compensate spherical aberration is to adopt a collimating SA compensator. The collimating SA compensator is composed of collimating lens. The position of the collimating lens is changed so as to adjust the optical path difference between the marginal rays and the paraxial rays of the laser light so that spherical aberration is compensated.

That is to say, the optical path difference $\Delta\lambda$ between the marginal rays and the paraxial rays of the laser light reaching to the foci plane is compensated once the SA compensating value is inputted to the SA compensator.

Figure 2A:
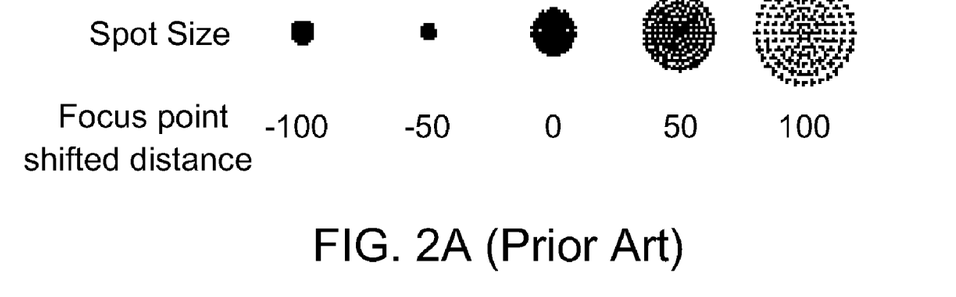
FIG. 2A, FIG. 2B and FIG. 2C (Prior art) illustrate simulated spot diagrams of the optical disc drive.
Figure 2B:
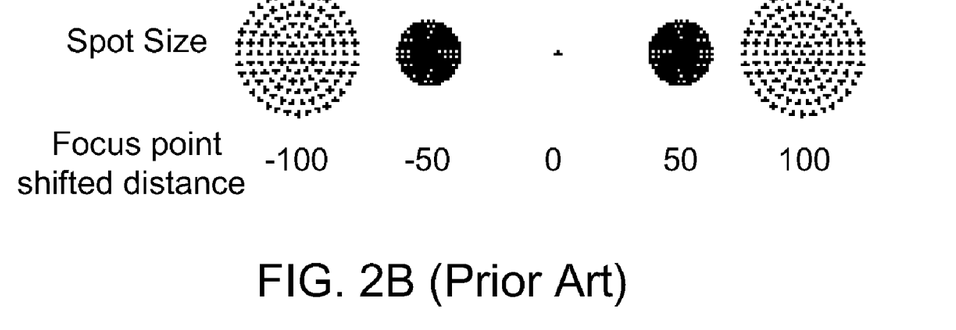
Figure 2C:
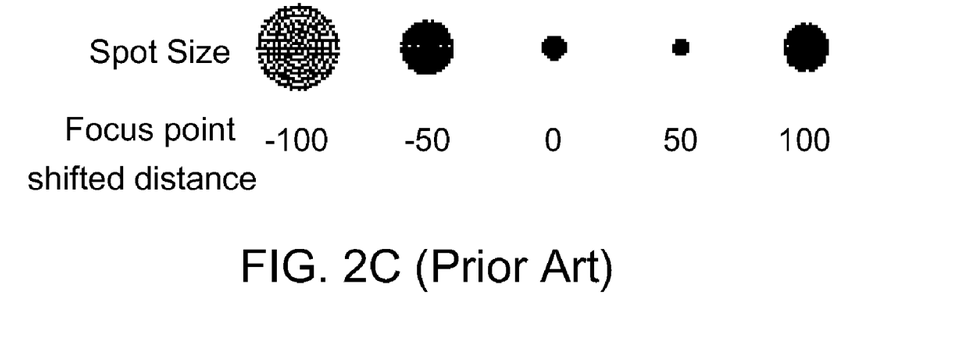

Please refer to FIG. 2A, FIG. 2B and FIG. 2C, which illustrates simulated spot diagrams of the optical disc drive. As shown in FIG. 2B, the optimal focus point is at position "0" when a cover layer of an optical disc is 0.6 mm and the SA compensating value "0" is provided. When the thickness of the optical disc (DVD) varies from 0.6 mm to 0.55 mm due to process variation, the optimal focus point shifts 50 μm to the negative direction as shown in FIG. 2A, while the thickness of the optical disc (DVD) varies from 0.6 mm to 0.65 mm due to process variation, the optimal focus point shifts 50 μm to the positive direction as shown in FIG. 2A. However, the quality of the optical signal measured in the optimal focus point of FIG. 2A or FIG. 2C is already deteriorated which result in that the spot size in the optimal focus point of FIG. 2A or FIG. 2C is rather bigger than the spot size in the optimal focus point of FIG. 2B.

In other words, the optimal focus point shifts when a spherical aberration exists in the optical system, the corresponding optimal SA compensating value at the shifted focus point is to be acquired so that the spherical aberration can be compensated. Likewise, when the SA compensating value or the optical path difference of the laser light is adjusted which compensates the spherical aberration, the optimal focus point of the optical disc drive would also shifts. Therefore the best way to assure the best read/write quality of the optical disc drive (i.e. assure the optical disc drive positioned at the optimal focus point) is to adjust the variables of focus bias $FE_{bias}$ and SA compensating value $SA_{value}$ at the same time.

Figure 3:
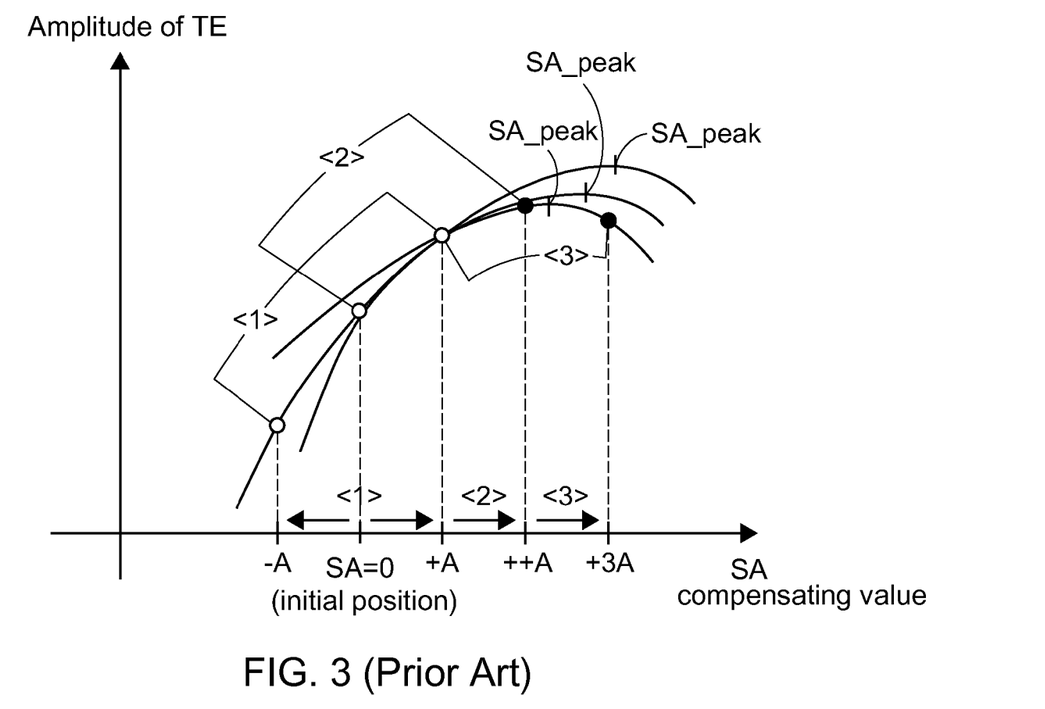
FIG. 3 (Prior art) is illustrates a method for adjusting SA compensating value in U.S. Publication 2008/0074973.

However, most prior arts only provide methods for determining an optimal SA compensating value. Please refer to FIG. 3, which illustrates a method for adjusting SA compensating value in U.S. Publication 2008/0074973. Firstly, an amplitude of an tracking error signal $TE_{VPP}$ is adopted as an index signal for quantifying spherical aberration. The amplitudes of the tracking error signal corresponding to SA compensating values (SA=A, SA=0, SA=−A) are measured. The optimal SA compensating value SA_peak corresponding to the largest amplitude of the tracking error signal is then acquired by performing second-order approximation of the three measured point. However, if the optimal SA compensating value SA_peak is not within a limited range, the above steps are repeated until the optimal SA compensating value SA_peak within the limited range is acquired. Nevertheless, the above method for adjusting SA compensating value omits the fact of the optimal focus point shifting. Even the spherical aberration is corrected, the focus point corresponding the adjusted SA compensating value is not at the optimal position.

Figure 4:
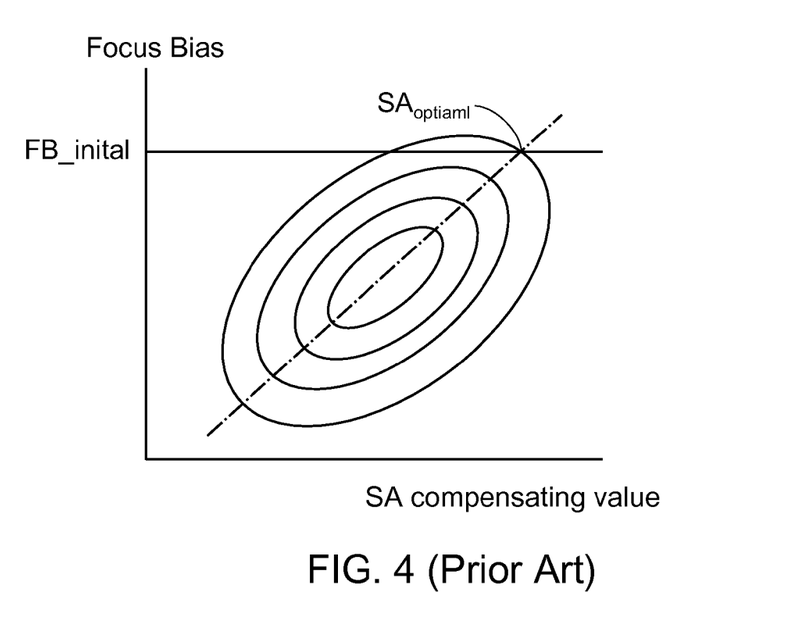
FIG. 4 (Prior art) is diagram illustrating an effectiveness diagram of the SA compensating value and the focus bias versus spherical aberration.

Please refer to FIG. 4, which illustrates an effectiveness diagram of the SA compensating value and the focus bias versus spherical aberration. An index signal for quantifying the spherical aberration is adopted, i.e. an amplitude of reproduction jitter for example. The index signal positioned more inside the ellipse represents that the value of the index signal is close to an extreme value and the image quality of the laser light is optimal. If the optical disc drive sets an initial focus point $FB_{initial}$ at a deviated area as shown in FIG. 4, the optimal SA compensating value $SA_{optimal}$ corresponding to the initial focus bias is actually not the optimal SA compensating value of the optical disc drive. The optical disc drive with the optimal SA compensating value $SA_{optimal}$ does not have best read/write quality because spherical aberration still occurs. Therefore, the focus bias $FE_{bias}$ and the SA compensating value $SA_{value}$ are to be adjusted at the same time which ensures the optical disc drive having the best read/write quality.

Hence, U.S. Pat. No. 7,344,077 provides a method for adjusting the focus bias and the SA compensating values at the same time. The method mainly searches different combinations of focus bias and SA compensating value in 2D direction and a quadratic curve approximation is performed on the searched points so that an optimal combination of focus bias and SA compensating value is acquired. The method finds the most optimal combination of focus bias and SA compensating value, however the quadratic curve approximation is too complex and wasting a lot of system resource and memory space. Therefore, How to acquire an optimal combination of focus bias and SA compensating value rapidly and efficiently is the subject matter of the present invention.

SUMMARY OF THE INVENTION

Therefore, the object of the present invention is to provide a method for determining the optimal combination of focus bias and SA compensating value in an optical disc. The disadvantage of the prior art which only adjusts the SA compensating value and neglects the shifting effect of the focus point is improved so that the read/write quality of the optical disc drive is enhanced.

The present invention provides a method for determining an optimal combination of focus bias and SA compensating value in an optical disc drive which comprises a focus activator and a spherical aberration compensator. Firstly, the focus bias is set to a first focus bias, the SA compensating value is adjusted and the corresponding index signal is measured. A first extreme value of the index signal is obtained by second order approximation. Secondly, the focus bias is set to a second focus bias, the SA compensating value is adjusted and the corresponding index signal is measured. A second extreme value of the index signal is obtained by second order approximation. Thirdly, the focus bias is set to a third focus bias, the SA compensating value is adjusted and the corresponding index signal is measured. A third extreme value of the index signal is obtained by second order approximation. The optimal combination of focus bias and SA compensating value is acquired according to compared result of the three extreme values.

Wherein, the index signal is an amplitude of a servo signal. The servo signal may be radio frequency signal (RF), RF envelope signal (RFBH), or main push pull signal (MPP). Moreover, the index signal can also replaced with an amplitude of reproduction jitter.

In addition, the present invention provides another method for determining an optimal combination of focus bias and SA compensating value in an optical disc drive which comprises a focus activator and a spherical aberration compensator. Firstly, the SA compensating value is set to a first SA compensating value, the focus bias is adjusted and the corresponding index signal is measured. A first extreme value of the index signal is obtained by second order approximation. Secondly, the SA compensating value is set to a second SA compensating value, the focus bias is adjusted and the corresponding index signal is measured. A second extreme value of the index signal is obtained by second order approximation. Thirdly, the SA compensating value is set to a third SA compensating value, the focus bias is adjusted and the corresponding index signal is measured. A third extreme value of the index signal is obtained by second order approximation. The optimal combination of focus bias and SA compensating value is acquired according to compared result of the three extreme values.

Wherein, the index signal is an amplitude of a servo signal. The servo signal may be radio frequency signal (RF), RF envelope signal (RFBH), or main push pull signal (MPP). Moreover, the index signal can also replaced with an amplitude of reproduction jitter.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 5:
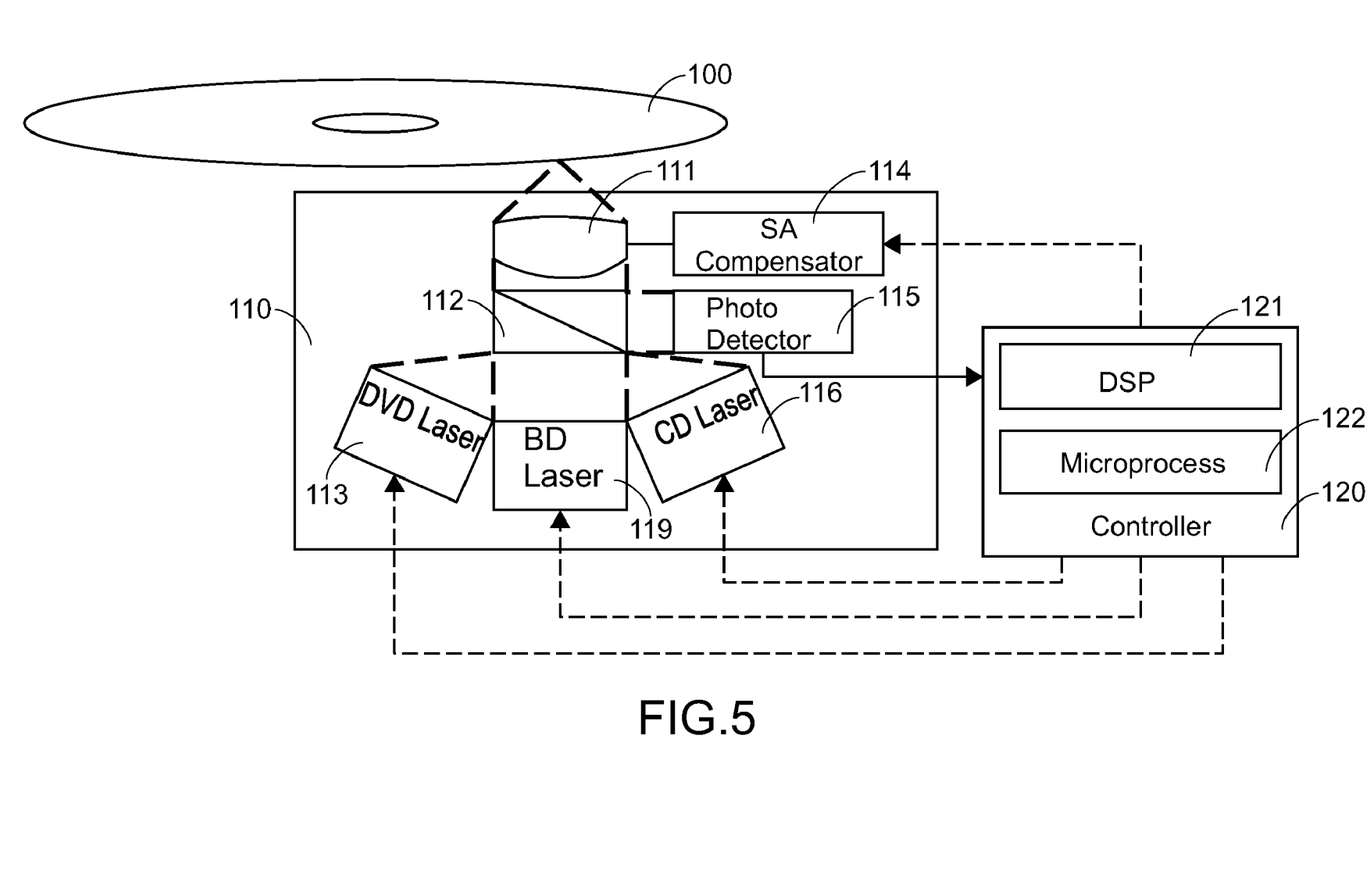
FIG. 5 is a diagram illustrating an optical disc drive according to the present invention.

Please refer to FIG. 5, which illustrates an optical disc drive according to the present invention. The optical pickup head 110 comprises a Blu-ray (BD) laser light source 119, a DVD laser light source 113 and a CD laser light source 116 which provides for reading different kinds of discs. The BD laser light source 119, the DVD laser light source 113 and the CD laser light source 116 passes through a collimator 112 and an objective lens 111 and then focuses on data layer of the optical disc 100. The reflected laser light projects on the light detectors 115 which transfer the light signal into an electrical signal. The electrical signal is then calculated by the digital signal processor (DSP) 121 of the controller 120, and thus detective signals such as radio frequency signal (RF), RF envelope signal (RFBH), main push-pull signal (MPP), tracking error signal (TE) and reproduced data jitter and etc., are acquired. Wherein the controller 120 controls turning on/off the BD laser light source 119, the DVD light source 113 and the CD light source 116. The controller 120 also controls a focus activator (750 of FIG. 6) with the aid of a driving motor driving the object lens 111 to the optimal focus point according to the focus bias. Moreover, an SA compensating value is inputted to a spherical compensator 114 so that the light spot focused on the optical disc with spherical aberration is hence compensated. Therefore, the optical storage system may maintain the best read/write quality.

Generally speaking, the SA compensating values are provided by optical pickup head manufacturers. The present invention may acquire the optimal SA compensating value by adjusting the SA compensating value provided by the optical pickup head manufacturers, but is not limited thereto.

Figure 6:
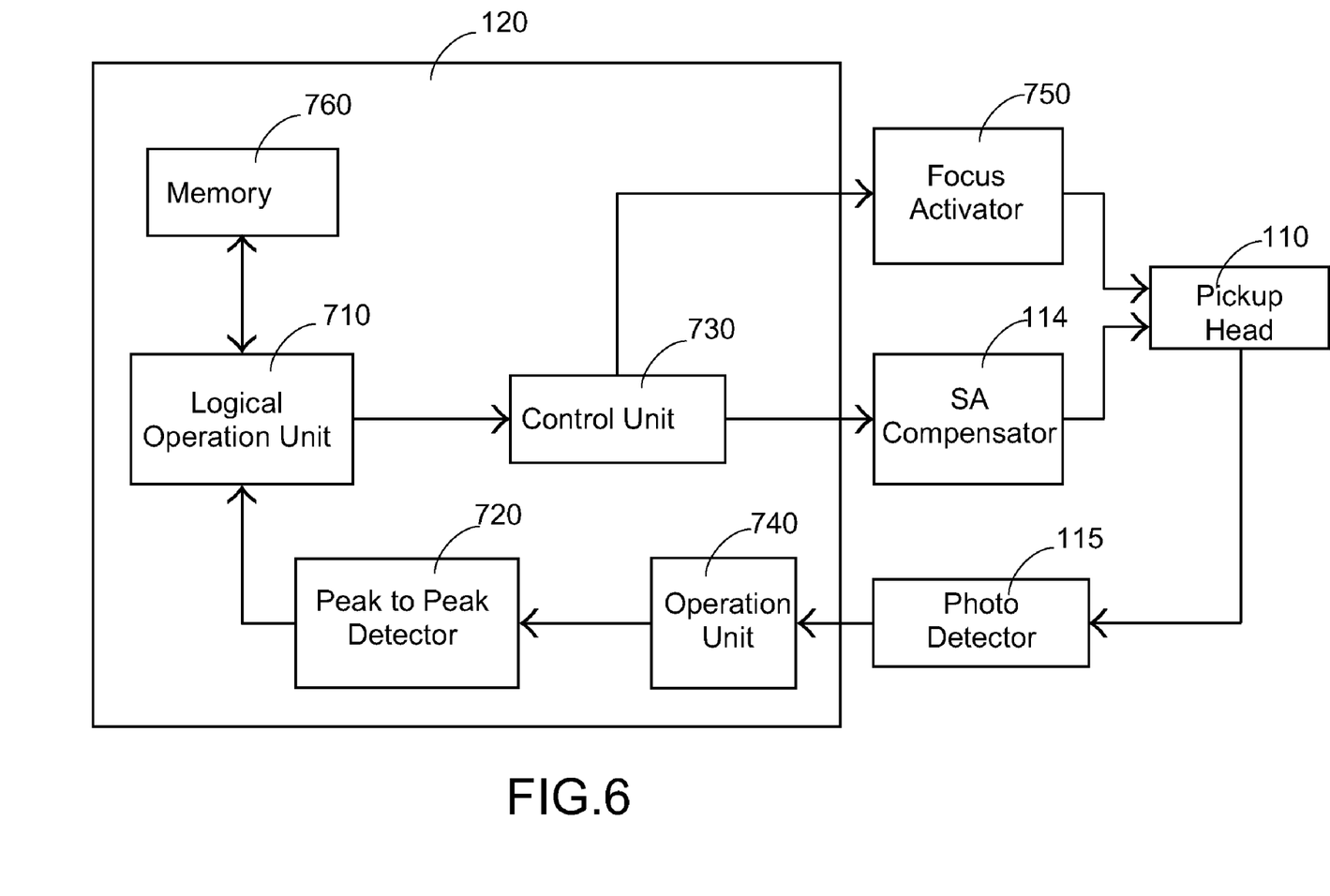
FIG. 6 illustrates a block diagram of the controllers 120 according to the present invention.

Please refer to FIG. 6, which illustrates a block diagram of the controllers 120 according to the present invention. Firstly, when the optical disc drive reads an optical disc 100, the control unit 730 outputs a control signal to the focus activator 750 and an SA compensator 114 according to the process of determining the optimal combination of focus bias and SA compensating value. The photo detector 115 outputs ABCD signals to the operation unit 740 according to the reading result, and a detection signal, such as a main push-pull signal (MPP: (A+D)−(B+C)) or an envelope of radio frequency signal (RF envelope: RFBH), is generated by the operation unit 740. Then, a peak to peak detector 720 calculates the peak to peak value $V_{PP}$ of the detection signal. Thereafter the logic operation unit 710 obtains an extreme value by performing second order approximation according to the peak to peak value $V_{PP}$ so that the optimal combination of focus bias and SA compensating value is thus acquired. At last, the optimal combination of focus bias and SA compensating value is inputted to the focus activator 750 and the SA compensator 114 by the aid of the control unit 730 to drive the optical pickup head 110. Moreover, the operation unit 740, the peak to peak detector 720 and the logical operation unit 710 can also be realized with firmware.

Figure 7:
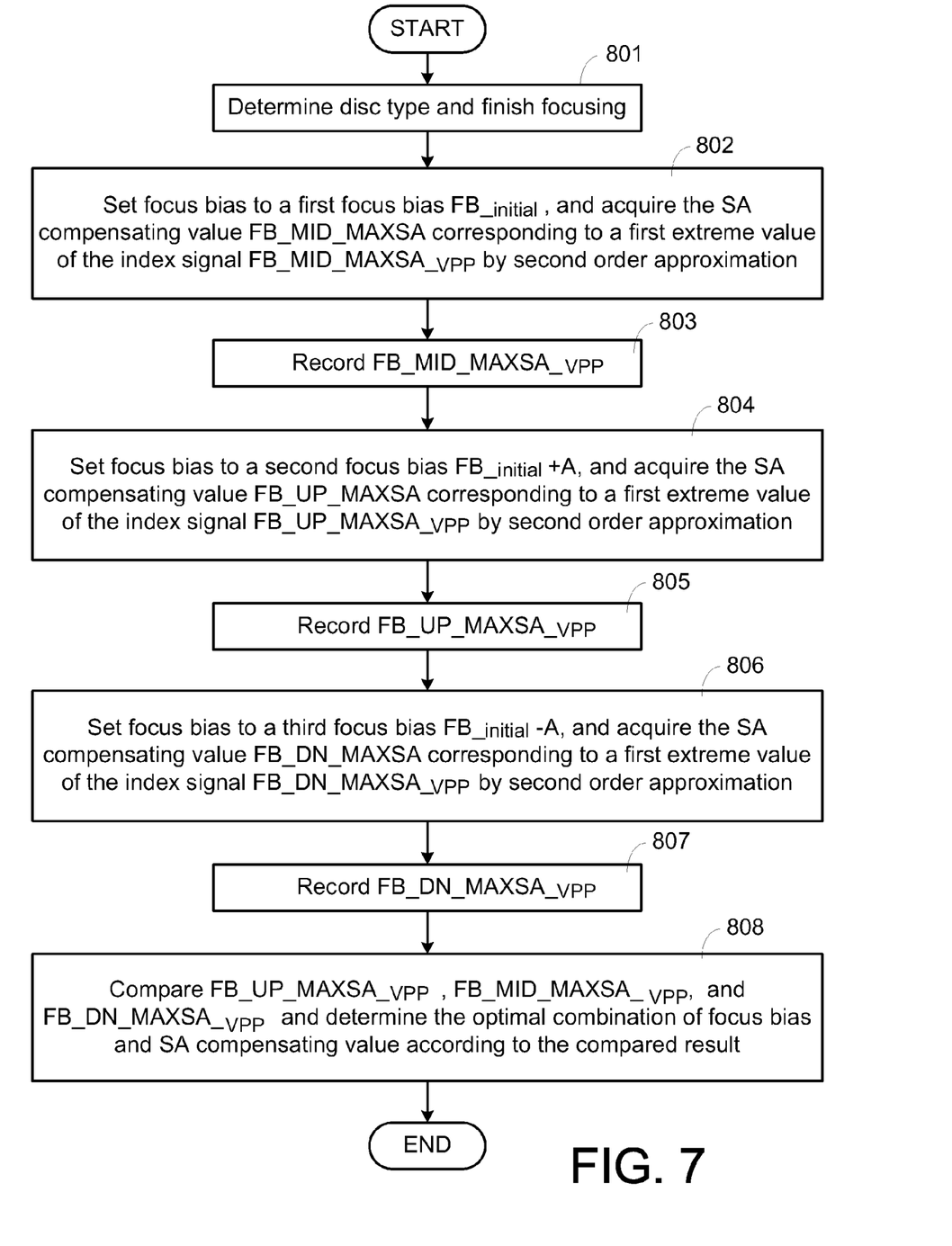
FIG. 7 illustrates a flow chart of the method for determining an optimal combination of focus bias and SA compensating value according to a first embodiment of the present invention.

Therefore, Method for determining an optimal combination of focus bias and SA compensating value in an optical disc drive is described in detail as below. Refer to FIG. 7, which illustrates a flow chart of the method for determining an optimal combination of focus bias and SA compensating value according to a first embodiment of the present invention.

Step 801: determine the disc type and finish focusing.

Step 802: set focus bias to a first focus bias $FB_{\_initial}$, and acquire the SA compensating value FB_MID_MAXSA corresponding to a first extreme value of the index signal FB_MID_MAXSA$_{\_vpp}$ by second order approximation.

Step 803: record the first extreme value FB_MID_MAXSA$_{\_vpp}$.

Step 804: set focus bias to a second focus bias $FB_{\_initial}$+A, and acquire the SA compensating value FB_UP_MAXSA corresponding to a second extreme value of the index signal FB_UP_MAXSA$_{\_vpp}$ by second order approximation.

Step 805: record the second extreme value FB_UP_MAXSA$_{\_vpp}$.

Step 806: set focus bias to a third focus bias $FB_{\_initial}$−A, and acquire the SA compensating value FB_DN_MAXSA corresponding to a third extreme value of the index signal FB_DN_MAXSA$_{\_vpp}$ by second order approximation.

Step 807: record the third extreme value FB_DN_MAXSA$_{\_vpp}$.

Step 808: compare the three extreme values FB_MID_MAXSA$_{\_vpp}$, FB_UP_MAXSA$_{\_vpp}$, FB_DN_MAXSA$_{\_vpp}$, and determine the optimal combination of focus bias and SA compensating value according to the compared result.

Figure 8:
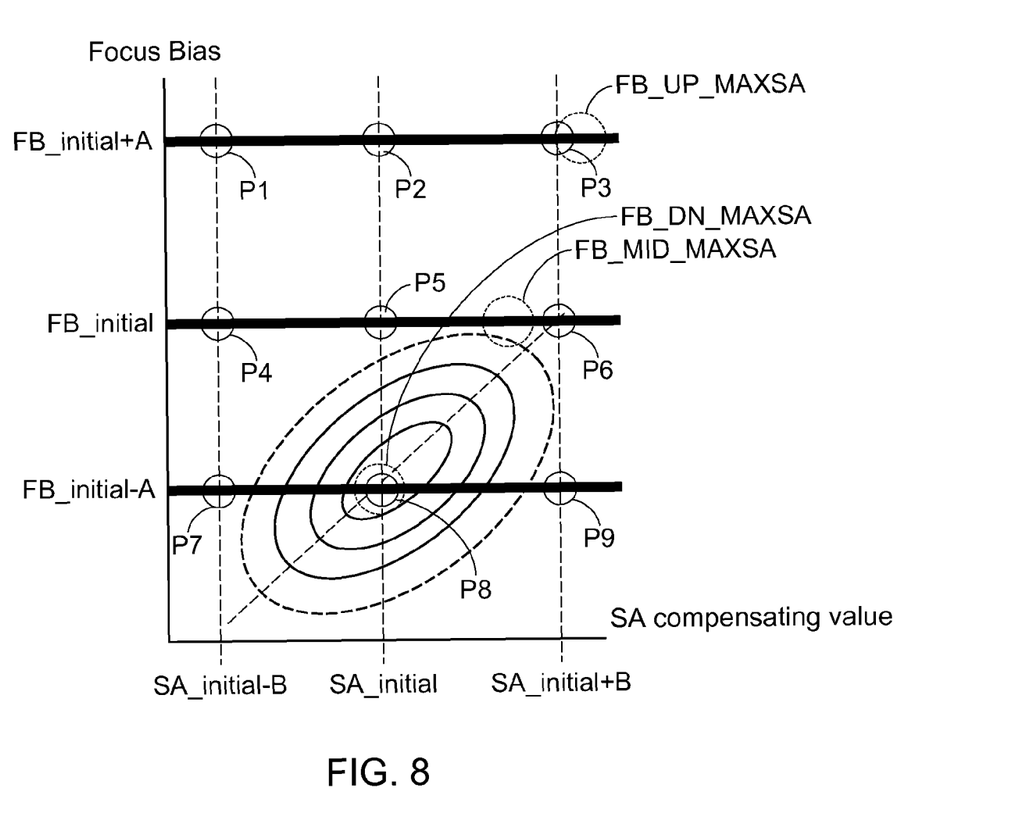
FIG. 8 illustrates a diagram showing how to determining the optimal combination of focus bias and SA compensating value according to the first embodiment of the present invention.

Please refer to FIG. 8, which illustrates a diagram showing how to determine the optimal combination of focus bias and SA compensating value according to the first embodiment of the present invention. When spherical aberration occurs, the optimal position of focus point shifts to a specific direction. The tilted ellipse shows the spherical astigmatism (SA) distribution which is effected by the focus bias and the SA compensating value. The SA value of the optical disc drive distributes in a shape of an ellipse. The SA value of the optical disc drive locates more inside the ellipse, the spherical astigmatism exists less in the optical disc drive. That is to say, the optical disc drive adopting the combination of focus bias and SA compensating value which is corresponding to SA value positioned in the most inner part of the ellipse obtains the best optical read/write quality and has minimum reproduction jitter value.

In order to search an area which is corresponding to the optimal combination of focus bias and SA compensating value on a surface, nine points (combinations of focus bias and SA compensating value) are calculated by second order approximation to acquire three extreme values. The three extreme values of the index signal are then compared to acquire the area which has the optimal read/write quality. Fox example, if adopting the amplitude (peak to peak value) of the tracking error signal TE$_{VPP}$ as the index signal, the optical disc drive adopting the combination of focus bias and SA compensating value corresponding to the maximum value of the index signal has the optimal read/write quality.

Please refer to FIG. 8, when the focus bias is set to be a first focus bias $FB_{\_initial}$, the index signal TE$_{VPP}$ corresponding to the first SA compensating value SA$_{initial}$+A, the second SA compensating value SA$_{initial}$, the third SA compensating value SA$_{initial}$−A are respectively P4, P5 and P6. Perform second order approximation on P4, P5 and P6 to acquire a first extreme value of the index signal FB_MID_MAXSA$_{\_VPP}$. The first extreme value FB_MID_MAXSA$_{\_VPP}$ is corresponding to the SA compensating value FB_MID_MAXSA and the first focus bias $FB_{\_initial}$.

Likewise, when the focus bias is set to be a second focus bias $FB_{initial}$+A, the index signal TE$_{VPP}$ corresponding to the first SA compensating value SA$_{initial}$+A, the second SA compensating value SA$_{initial}$, the third SA compensating value SA$_{initial}$−A are respectively P1, P2 and P3. Perform second order approximation on P1, P2 and P3 to acquire a second extreme value of the index signal. The second extreme value FB_UP_MAXSA$_{\_VPP}$ is corresponding to the SA compensating value FB_UP_MAXSA and the second focus bias $FB_{initial}$+A.

Likewise, when the focus bias is set to be a third focus bias $FB_{initial}$−A, the index signal TE$_{VPP}$ corresponding to the first SA compensating value SA$_{initial}$+A, the second SA compensating value SA$_{initial}$, the third SA compensating value SA$_{initial}$−A are respectively P7, P8 and P9. Perform second order approximation on P7, P8 and P9 to acquire a third extreme value of the index signal. The third extreme value FB_DN_MAXSA$_{\_VPP}$ is corresponding to the SA compensating value FB_DN_MAXSA and the third focus bias $FB_{initial}$.

The three extreme values of the index signal FB_UP_MAXSA$_{\_VPP}$, FB_MID_MAXSA$_{\_VPP}$, FB_DN_MAXSA$_{\_VPP}$ are compared according to the first embodiment of the present invention and the focus bias and the SA compensating value corresponding to minimum spherical aberration is acquired according to the compared result. Take FIG. 8 for example, the maximum index signal is FB_DN_MAXSA$_{\_VPP}$ according to the compared result. The optical disc drive adopting the third focus bias $FB_{initial}$−A and the SA compensating value FB_DN_MAXSA which corresponds to the maximum index signal FB_DN_MAXSA$_{\_VPP}$ has minimum spherical aberration affected and optimal read/write quality.

Therefore, the subject matter of the present invention is performing second order approximation three times to acquire three extreme values of the index signal and the corresponding SA compensating values. The three extreme values of the index signal are then compared and the optimal combination of focus bias and SA compensating value in the optical disc drive is acquired according to the compared result.

The first embodiment firstly fix the focus bias value and adjust the SA compensating value to acquire the index signal (P1,P2,P3) (P4,P5,P6) (P7,P8,P9). Three extreme values of the index signal corresponding to three respective SA compensating values are calculated by second order approximation. The optimal combination of focus bias and SA compensating value is thus obtained according to the compared result of the three extreme values. However, the present invention is not limited thereto. The determining sequence can also be rearranged to acquire similar results. For example, the SA compensating value is fixed firstly and the focus bias is adjusted to acquire the index signal (P1,P4,P7) (P2,P5,P8) (P3,P6,P9). Three extreme values of the index value corresponding to three respective focus biases are calculated by second order approximation. The optimal combination of focus bias and SA compensating value in the optical disc drive is thus obtained according to the compared result of the three extreme values.

Figure 9A:
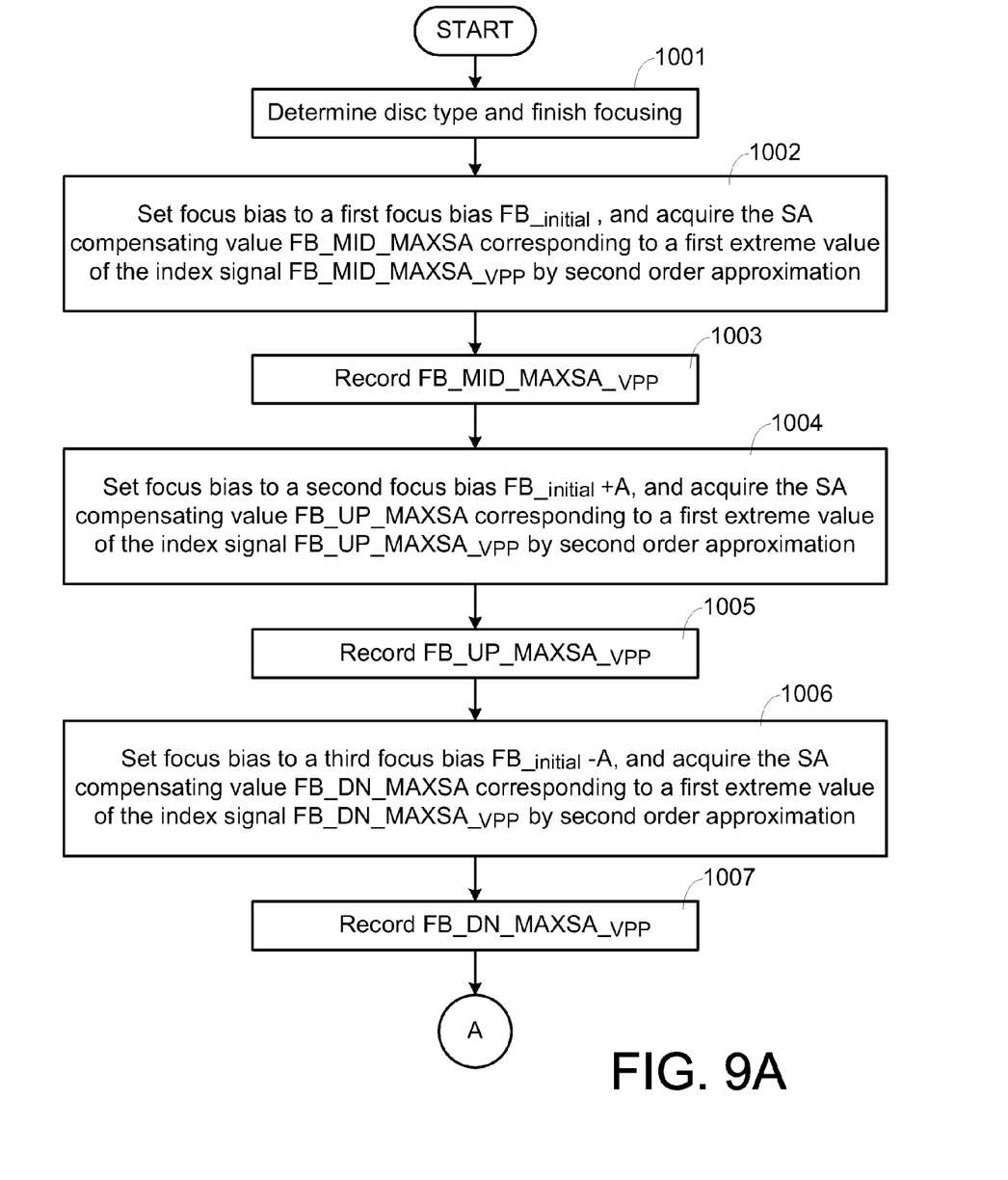
FIG. 9A and FIG. 9B is a block diagram illustrating a flow chart of the method for determining the number of data layers in an optical disc according to the second embodiment of the present invention FIG. 10, which illustrates steps 1009 and 1010 according to the second embodiment of the present invention.
Figure 9B:
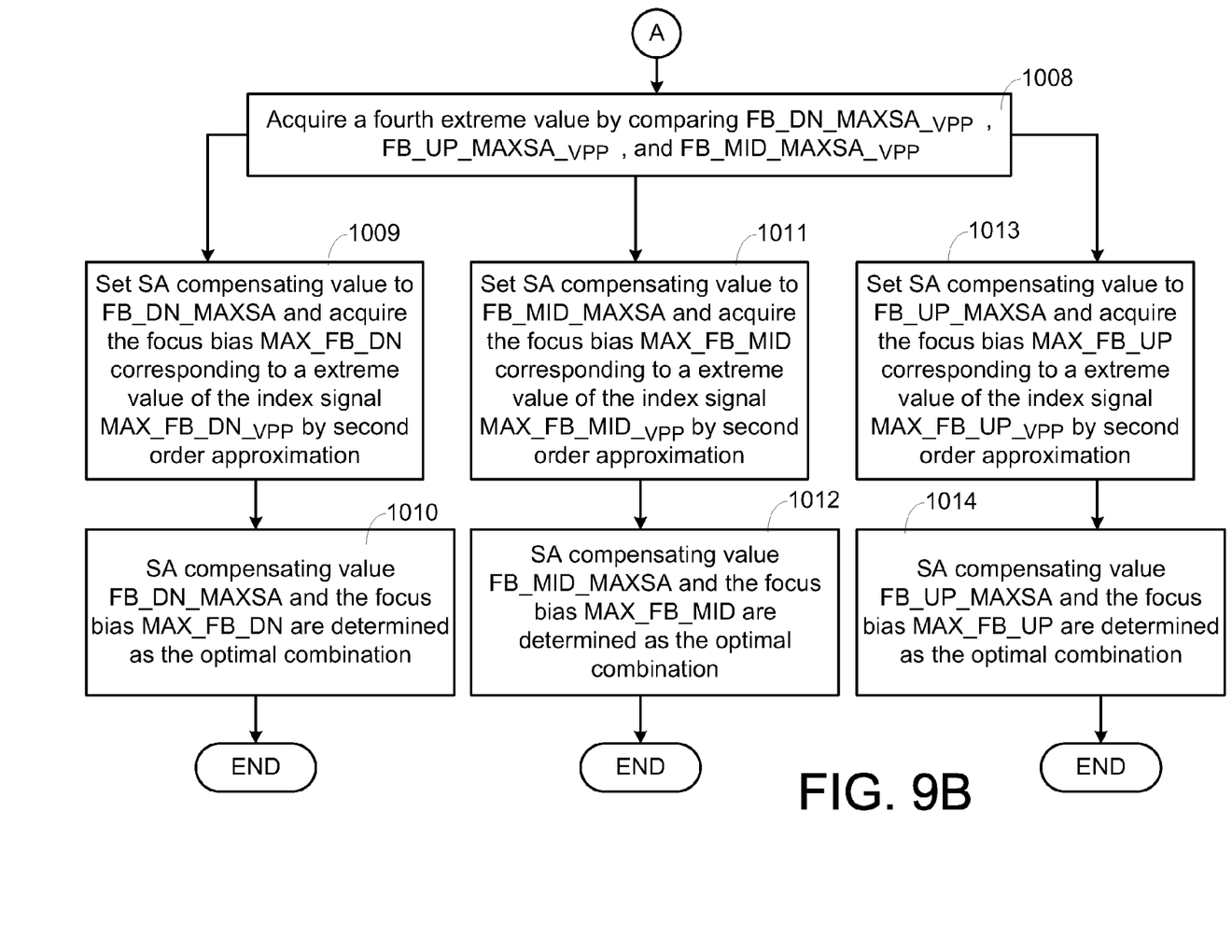

Refer to FIG. 9A and FIG. 9B, which illustrates a flow chart of the method for determining an optimal combination of focus bias and SA compensating value according to a second embodiment of the present invention.

Step 1001: determine the disc type and finish focusing.

Step 1002: set focus bias to a first focus bias FB$_{\_initial}$, and acquire the SA compensating value FB_MID_MAXSA corresponding to a first extreme value of the index signal FB_MID_MAXSA$_{\_vpp}$ by second order approximation.

Step 1003: record the first extreme value FB_MID_MAXSA$_{\_vpp}$.

Step 1004: set focus bias to a second focus bias FB$_{\_initial}$+A, and acquire the SA compensating value FB_UP_MAXSA corresponding to a second extreme value of the index signal FB_UP_MAXSA$_{\_vpp}$ by second order approximation.

Step 1005: record the second extreme value FB_UP_MAXSA$_{\_vpp}$.

Step 1006: set focus bias to a third focus bias FB$_{\_initial}$−A, and acquire the SA compensating value FB_DN_MAXSA corresponding to a third extreme value of the index signal FB_DN_MAXSA$_{\_vpp}$ by second order approximation.

Step 1007: record the third extreme value FB_DN_MAXSA$_{\_vpp}$.

Step 1008: compare the three extreme values FB_MID_MAXSA$_{\_vpp}$, FB_UP_MAXSA$_{\_vpp}$, FB_DN_MAXSA$_{\_vpp}$, to obtain a fourth extreme value. When the fourth extreme value equals FB_DN_MAXSA$_{\_vpp}$, proceeds step 1009; and when the fourth extreme value equals FB_MID_MAXSA$_{\_vpp}$, proceeds step 1011; When the fourth extreme value equals FB_UP_MAXSA$_{\_vpp}$, proceeds step 1013.

Step 1009: set SA compensating value to FB_DN_MAXSA, and acquire the focus bias MAX_FB_DN corresponding to an extreme value of the index signal MAX_FB_DN$_{\_vpp}$ by second order approximation.

Step 1010: set the optimal combination of focus bias and SA compensating value to be focus bias MAX_FB_DN and SA compensating value FB_DN_MAXSA.

Step 1011: set SA compensating value to FB_MID_MAXSA, and acquire the focus bias MAX_FB_MID corresponding to an extreme value of the index signal MAX_FB_MID$_{\_vpp}$ by second order approximation.

Step 1012: set the optimal combination of focus bias and SA compensating value to be focus bias MAX_FB_MID and SA compensating value FB_MID_MAXSA.

Step 1013: set SA compensating value to FB_UP_MAXSA, and acquire the focus bias MAX_UP_DN corresponding to an extreme value of the index signal MAX_FB_UP$_{\_vpp}$ by second order approximation.

Step 1014: set the optimal combination of focus bias and SA compensating value to be focus bias MAX_FB_UP and SA compensating value FB_UP_MAXSA.

Figure 11:
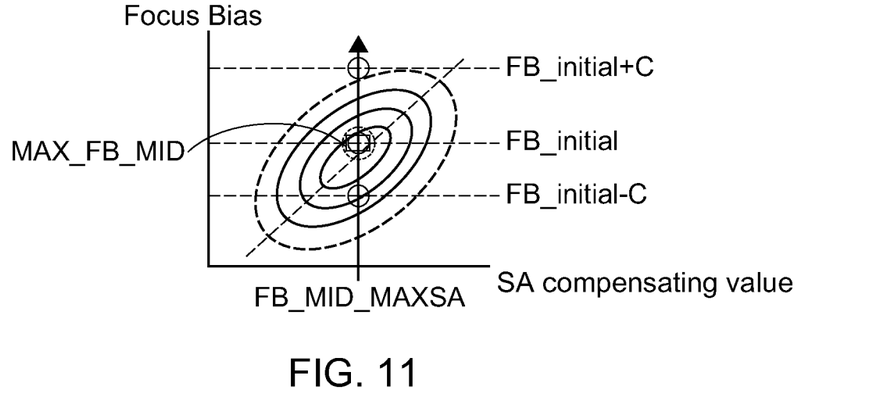
FIG. 11, which illustrates steps 1011 and 1012 according to the second embodiment of the present invention.

Refer to FIG. 11, which illustrates steps 1011 and 1012 according to the second embodiment of the present invention. When the optimal compensating value FB_MID_MAX_SA is acquired, the SA compensating value is fixed to FB_MID_MAX_SA and the focus bias is adjusted up and down to a fourth focus bias FB$_{\_initial}$+C and a fifth focus bias FB$_{\_initial}$−A−C respectively. The index signal corresponding to the fourth focus bias FB$_{\_initial}$+C and the fifth focus bias FB$_{\_initial}$−A−C is then measured. Performing second order approximation on the index signal corresponding to the fourth focus bias FB$_{\_initial}$+A, the first focus bias FB$_{\_initial}$ and the fifth focus bias FB$_{\_initial}$−A−C to obtain a focus bias MAX_FB_MID which corresponds to a maximum index signal MAX_FB_MID$_{\_VPP}$. The focus bias MAX_FB_MID and the SA compensating value FB_MID_MAX_SA is therefore the optimal combination of focus bias and SA compensating value in the optical disc drive.

Figure 12:
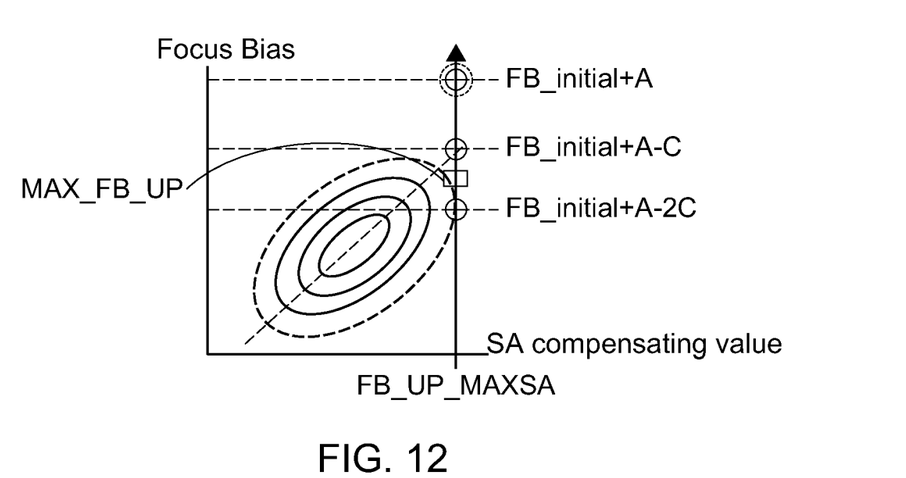
FIG. 12, which illustrates steps 1013 and 1014 according to the second embodiment of the present invention.

Refer to FIG. 12, which illustrates steps 1013 and 1014 according to the second embodiment of the present invention. When the optimal compensating value FB_UP_MAX_SA is acquired, the SA compensating value is fixed to FB_UP_MAX_SA and the focus bias is adjusted down twice to a sixth focus bias FB$_{\_initial}$+A−C and a seventh focus bias FB$_{\_initial}$+A−2C respectively. The index signal corresponding to the sixth focus bias FB$_{\_initial}$+A−C and the fifth focus bias FB$_{\_initial}$+A−2C is then measured. Performing second order approximation on the index signal corresponding to the sixth focus bias FB$_{\_initial}$+A−C, the second focus bias FB$_{\_initial}$ and the seventh focus bias FB$_{\_initial}$+A−2C to obtain a focus bias MAX_FB_UP which corresponds to a maximum index signal MAX_FB_UP$_{\_VPP}$. The focus bias MAX_FB_UP and the SA compensating value FB_UP_MAX_SA is therefore the optimal combination of focus bias and SA compensating value in the optical disc drive.

Figure 10:
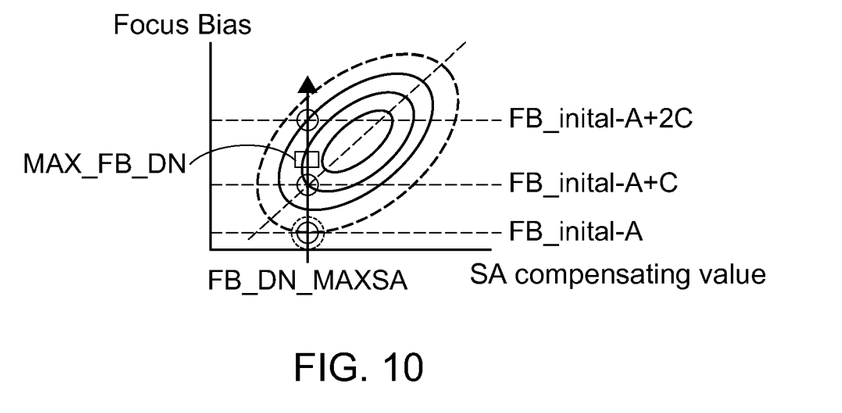

Refer to FIG. 10, which illustrates steps 1009 and 1010 according to the second embodiment of the present invention. When the optimal compensating value FB_DN_MAX_SA is acquired, the SA compensating value is fixed to FB_DN_MAX_SA and the focus bias is adjusted up and down to a eighth focus bias FB$_{\_initial}$−A+2C and a ninth focus bias FB$_{\_initial}$−A+C respectively. The index signal corresponding to the eighth focus bias FB$_{\_initial}$−A+2C and the ninth focus bias FB$_{\_initial}$−A+C is then measured. Performing second order approximation on the index signal corresponding to the eighth focus bias FB$_{\_initial}$−A+2C, the third focus bias FB$_{\_initial}$−A and the ninth focus bias FB$_{\_initial}$−A+C to obtain a focus bias MAX_FB_DN which corresponds to a maximum index signal MAX_FB_DN$_{\_VPP}$. The focus bias MAX_FB_DN and the SA compensating value FB_DN_MAX_SA is therefore the optimal combination of focus bias and SA compensating value in the optical disc drive.

The second embodiment and the first embodiment differs in that the second embodiment performs second order approximations again on the determining result of the first embodiment to obtain a more optimal combination of focus bias and SA compensating value which more conforms to the optical requirement of the optical disc drive. The second embodiment of the present invention is to be adopted when the optical disc drive is with stricter optical requirement.

In addition, the above two embodiments adopts an amplitude of a tracking error signal $TE_{VPP}$ as the index signal, but the invention is not limited thereto. The index signal may also be replaced with an amplitude of a servo signal which is related to spherical aberration. The servo signal may be radio frequency signal RF, RF envelope RFBH, main push pull signal MPP, differential push pull tracking error signal DPP TEs, DPD TE, and so on. The amplitudes (peak to peak values) of the servo signals mentioned above are all related to optical quality. The larger the index signal is, the better the optical quality of the optical disc drive is. So when the above embodiments adopt an amplitude of the servo signal as the index signal, the extreme value means the maximum value. That is to say, the combination of focus bias and SA compensating value corresponding to the maximum servo signal is the optimal one for the optical disc drive.

However, if the embodiments adopt an amplitude of reproduction jitter as the index signal, the smaller the amplitude of reproduction jitter is, the better the optical quality of the optical disc drive is. So when the above embodiments adopt the amplitude of reproduction jitter as the index signal, the extreme value means the maximum value. That is to say, the combination of focus bias and SA compensating value corresponding to the minimum reproduction jitter is the optimal one for the optical disc drive.

It is to be noted that the two types of the index signal mentioned above can be adopted alone or adopted at the same time to assure that the optical disc drive provides the best optical quality for reading/writing the optical disc. It is recommended that adopting the amplitude of main push pull signal MPP or the amplitude of RF envelope RFBH as the index signal when the optical disc drive has focused on the optical disc but before on track and adopting the amplitude of reproduction jitter as the index signal after the optical disc drive has been on track.

In addition, adopting the amplitude of main push pull signal MPP or the amplitude of RF envelope RFBH depends on whether the optical disc contains data or not. A blank optical disc contains no data, so only the amplitude of main push pull signal MPP can be adopted as the index signal. And both the amplitude of main push pull signal MPP and the amplitude of RF envelope RFBH can be adopted as the index signal if the optical disc is a ROM disc.

Thus, the virtue of the present invention is effectively determining the optimal combination of focus bias and SA compensating value in an optical disc drive. The extreme values of the index signal and corresponding focus biases and SA compensating values are acquired by performing second order approximation three times. The optimal combination of focus bias and SA compensating value in the optical disc drive is obtained by comparing the three extreme values. This method improves the disadvantage of the prior art which only adjusts the SA compensating value and neglects adjusting the focus bias. Although there's prior art performing quadratic curve approximation on the entire system to obtain an optimal combination of focus bias and SA compensating value. However the calculation of the quadratic curve approximation wastes a lot of system resources and the points which need to be calculated may be more. More than nine points is saved to proceed calculating. On the contrary, only three points is saved to perform the extreme value calculation by second order approximation according to the present invention. Therefore the present invention is more effectively and more flexible.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for determining an optimal combination of focus bias and SA compensating value in an optical disc drive which comprises a focus activator and a spherical aberration compensator comprising:

inputting a first focus bias to the focus activator and obtaining a first extreme value of the index signal by performing second order approximation;

inputting a second focus bias to the focus activator and obtaining a second extreme value of the index signal by performing second order approximation;

inputting a third focus bias to the focus activator and obtaining a third extreme value of the index signal by performing second order approximation; and comparing the first extreme value, the second extreme value and the third extreme value and determining the optimal combination of focus bias and SA compensating value according to the compared result.

2. The method for determining an optimal combination of focus bias and SA compensating value in an optical disc drive as claimed in claim 1, wherein the index signal is an amplitude of a servo signal.

3. The method for determining an optimal combination of focus bias and SA compensating value in an optical disc drive as claimed in claim 2, wherein the combination of focus bias and SA compensating value corresponding to the maximum one of the first extreme value, the second extreme value and the third extreme value is determined as the optimal combination of focus bias and SA compensating value.

4. The method for determining an optimal combination of focus bias and SA compensating value in an optical disc drive as claimed in claim 3 further comprises steps of:

fixing the SA compensating value to the SA compensating value corresponding to the first extreme value when the first extreme value is the maximum one according to the compared result;

adjusting the focus bias to the first focus bias, a fourth bias and a fifth focus bias and measuring the index signal corresponding to the respective focus bias; and determining the optimal combination of focus bias and SA compensating value by performing second order approximation on the measured index signal and their corresponding focus biases.

5. The method for determining an optimal combination of focus bias and SA compensating value in an optical disc drive as claimed in claim 3 further comprises steps of:

fixing the SA compensating value to the SA compensating value corresponding to the second extreme value when the second extreme value is the maximum one according to the compared result;

adjusting the focus bias to the second focus bias, a sixth bias and a seventh focus bias and measuring the index signal corresponding to the respective focus bias; and determining the optimal combination of focus bias and SA compensating value by performing second order approximation on the measured index signal and their corresponding focus biases.

6. The method for determining an optimal combination of focus bias and SA compensating value in an optical disc drive as claimed in claim 3 further comprises steps of:
fixing the SA compensating value to the SA compensating value corresponding to the third extreme value when the third extreme value is the maximum one according to the compared result;
adjusting the focus bias to the third focus bias, a eighth bias and a ninth focus bias and measuring the index signal corresponding to the respective focus bias; and
determining the optimal combination of focus bias and SA compensating value by performing second order approximation on the measured index signal and their corresponding focus biases.

7. The method for determining an optimal combination of focus bias and SA compensating value in an optical disc drive as claimed in claim 1, wherein the index signal is an amplitude of reproduction jitter.

8. The method for determining an optimal combination of focus bias and SA compensating value in an optical disc drive as claimed in claim 7, wherein the combination of focus bias and SA compensating value corresponding to the minimum one of the first extreme value, the second extreme value and the third extreme value is determined as the optimal combination of focus bias and SA compensating value.

9. The method for determining an optimal combination of focus bias and SA compensating value in an optical disc drive as claimed in claim 8 further comprises steps of:
fixing the SA compensating value to the SA compensating value corresponding to the first extreme value when the first extreme value is the minimum one according to the compared result;
adjusting the focus bias to the first focus bias, a fourth bias and a fifth focus bias and measuring the index signal corresponding to the respective focus bias; and
determining the optimal combination of focus bias and SA compensating value by performing second order approximation on the measured index signal and their corresponding focus biases.

10. The method for determining an optimal combination of focus bias and SA compensating value in an optical disc drive as claimed in claim 8 further comprises steps of:
fixing the SA compensating value to the SA compensating value corresponding to the second extreme value when the second extreme value is the minimum one according to the compared result;
adjusting the focus bias to the second focus bias, a sixth bias and a seventh focus bias and measuring the index signal corresponding to the respective focus bias; and
determining the optimal combination of focus bias and SA compensating value by performing second order approximation on the measured index signal and their corresponding focus biases.

11. The method for determining an optimal combination of focus bias and SA compensating value in an optical disc drive as claimed in claim 8 further comprises steps of:
fixing the SA compensating value to the SA compensating value corresponding to the third extreme value when the third extreme value is the minimum one according to the compared result;
adjusting the focus bias to the third focus bias, a eighth bias and a ninth focus bias and measuring the index signal corresponding to the respective focus bias; and
determining the optimal combination of focus bias and SA compensating value by performing second order approximation on the measured index signal and their corresponding focus biases.

12. The method for determining an optimal combination of focus bias and SA compensating value in an optical disc drive as claimed in claim 1, wherein the first extreme value is acquired by steps of:
fixing the focus bias to the first focus bias;
adjusting the SA compensating value to a first SA compensating value, a second SA compensating value and a third SA compensating value and measuring the corresponding the index signal; and
performing a second order approximation on the measured index signal and adjusted SA compensating value.

13. The method for determining an optimal combination of focus bias and SA compensating value in an optical disc drive as claimed in claim 1, wherein the first extreme value is acquired by steps of:
fixing the focus bias to the second focus bias;
adjusting the SA compensating value to a first SA compensating value, a second SA compensating value and a third SA compensating value and measuring the corresponding index signal; and
performing a second order approximation on the measured the index signal and adjusted SA compensating value.

14. The method for determining an optimal combination of focus bias and SA compensating value in an optical disc drive as claimed in claim 1, wherein the first extreme value is acquired by steps of:
fixing the focus bias to the third focus bias;
adjusting the SA compensating value to a first SA compensating value, a second SA compensating value and a third SA compensating value and measuring the corresponding index signal; and
performing a second order approximation on the measured index signal and adjusted SA compensating value.

15. A method for determining an optimal combination of focus bias and SA compensating value in an optical disc drive which comprises a focus activator and a spherical aberration compensator comprising:
inputting a first SA compensating value to the spherical aberration compensator and obtaining a first extreme value of the index signal by performing second order approximation;
inputting a second SA compensating value to the spherical aberration compensator and obtaining a second extreme value of the index signal by performing second order approximation;
inputting a third SA compensating value to the spherical aberration compensator and obtaining a third extreme value of the index signal by performing second order approximation; and
comparing the first extreme value, the second extreme value and the third extreme value and determining the optimal combination of focus bias and SA compensating value according to the compared result.

16. The method for determining an optimal combination of focus bias and SA compensating value in an optical disc drive as claimed in claim 15, wherein the index signal is an amplitude of a servo signal.

17. The method for determining an optimal combination of focus bias and SA compensating value in an optical disc drive as claimed in claim 16, wherein the combination of focus bias and SA compensating value corresponding to the maximum one of the first extreme value, the second extreme value and the third extreme value is determined as the optimal combination of focus bias and SA compensating value.

18. The method for determining an optimal combination of focus bias and SA compensating value in an optical disc drive as claimed in claim 15, wherein the index signal is an amplitude of reproduction jitter.

19. The method for determining an optimal combination of focus bias and SA compensating value in an optical disc drive as claimed in claim 15, wherein the combination of focus bias and SA compensating value corresponding to the minimum one of the first extreme value, the second extreme value and the third extreme value is determined as the optimal combination of focus bias and SA compensating value.

20. The method for determining an optimal combination of focus bias and SA compensating value in an optical disc drive as claimed in claim 15, wherein the first extreme value is acquired by steps of:
   fixing the SA compensating value to the first SA compensating value;
   adjusting the focus bias to a first focus bias, a second focus bias and a third focus bias and measuring the corresponding index signal; and
   performing a second order approximation on the measured index signal and adjusted focus bias.

21. The method for determining an optimal combination of focus bias and SA compensating value in an optical disc drive as claimed in claim 15, wherein the second extreme value is acquired by steps of:
   fixing the SA compensating value to the first SA compensating value;
   adjusting the focus bias to a first focus bias, a second focus bias and a third focus bias and measuring the corresponding index signal; and
   performing a second order approximation on the measured index signal and adjusted focus bias.

22. The method for determining an optimal combination of focus bias and SA compensating value in an optical disc drive as claimed in claim 15, wherein the third extreme value is acquired by steps of:
   fixing the SA compensating value to the third SA compensating value;
   adjusting the focus bias to a first focus bias, a second focus bias and a third focus bias and measuring the corresponding index signal; and
   performing a second order approximation on the measured index signal and adjusted focus bias.

* * * * *